United States Patent
Thiem et al.

(10) Patent No.: US 9,714,324 B2
(45) Date of Patent: Jul. 25, 2017

(54) METHOD FOR THE PRODUCTION OF ABS COMPOSITIONS HAVING AN IMPROVED SURFACE FOLLOWING STORAGE IN A WARM-HUMID ENVIRONMENT

(71) Applicant: COVESTRO DEUTSCHLAND AG, Leverkusen (DE)

(72) Inventors: Hans-Juergen Thiem, Dormagen (DE); Ingmar Hermsdorfer, Krefeld (DE); Birgit Mannel, Muelheim an der Ruhr (DE); Andreas Seidel, Dormagen (DE); Eckhard Wenz, Cologne (DE); Hans-Juergen Klankers, Leverkusen (DE); Lars Frye, Leichlingen (DE); Hartwig Kempkes, Overath (DE)

(73) Assignee: Covestro Deutschland AG, Leverkusen (DE)

( * ) Notice: Subject to any disclaimer, the term of this patent is extended or adjusted under 35 U.S.C. 154(b) by 20 days.

(21) Appl. No.: 14/764,618

(22) PCT Filed: Feb. 5, 2014

(86) PCT No.: PCT/EP2014/052258
§ 371 (c)(1),
(2) Date: Jul. 30, 2015

(87) PCT Pub. No.: WO2014/122178
PCT Pub. Date: Aug. 14, 2014

(65) Prior Publication Data
US 2015/0361225 A1  Dec. 17, 2015

(30) Foreign Application Priority Data
Feb. 7, 2013  (EP) ..................... 13154460

(51) Int. Cl.
*C08J 3/20*   (2006.01)
*C08J 3/00*   (2006.01)
*C08F 6/00*   (2006.01)
*C08F 6/28*   (2006.01)
*C08L 69/00*  (2006.01)

(52) U.S. Cl.
CPC ............... *C08J 3/005* (2013.01); *C08F 6/008* (2013.01); *C08F 6/28* (2013.01); *C08J 3/203* (2013.01); *C08L 69/00* (2013.01); *C08J 2369/00* (2013.01); *C08J 2433/20* (2013.01); *C08J 2455/02* (2013.01); *C08L 2205/025* (2013.01); *C08L 2205/035* (2013.01)

(58) Field of Classification Search
CPC .................................. C08F 6/008; C08J 3/203
USPC .................. 523/351; 524/417, 423, 436, 437
See application file for complete search history.

(56) References Cited

U.S. PATENT DOCUMENTS

| | | |
|---|---|---|
| 5,314,990 A | 5/1994 | Jansen et al. |
| 6,187,825 B1 | 2/2001 | Guntherberg et al. |
| 6,284,830 B1 | 9/2001 | Gottschalk et al. |
| 6,890,979 B2 | 5/2005 | Eichenauer et al. |
| 8,481,630 B2 | 7/2013 | Fischer et al. |
| 8,680,201 B2 | 3/2014 | Seidel et al. |
| 8,927,621 B2 | 1/2015 | Seidel et al. |
| 2007/0256316 A1 | 11/2007 | Jordison |
| 2013/0281595 A1 | 10/2013 | Seidel et al. |
| 2015/0065623 A1 | 3/2015 | Seidel et al. |

FOREIGN PATENT DOCUMENTS

| | | |
|---|---|---|
| DE | 2021398 A1 | 11/1970 |
| DE | 2815098 A1 | 10/1978 |
| DE | 3303164 A1 | 8/1983 |
| DE | 102005022632 A1 | 11/2006 |
| DE | 102006011074 A1 | 9/2007 |
| DE | 102006056523 A1 | 6/2008 |
| DE | 102009007789 B3 | 7/2010 |
| EP | 0893479 A1 | 1/1991 |
| EP | 459161 A2 | 12/1991 |
| EP | 2657258 A1 | 10/2013 |
| EP | 2657259 A1 | 10/2013 |
| JP | 11056092 | 3/1999 |
| WO | 9828344 A1 | 7/1998 |
| WO | 9857110 A1 | 12/1998 |
| WO | 0143556 A1 | 6/2001 |
| WO | 0166640 A1 | 9/2001 |
| WO | 2008020012 A2 | 2/2008 |
| WO | 2009071537 A2 | 6/2009 |
| WO | 2010094416 A1 | 8/2010 |

OTHER PUBLICATIONS

DE20061011074 machine translation of original dated (2007).*
International Search Report from corresponding PCT/EP2014/052258, mailed May 27, 2014.

* cited by examiner

*Primary Examiner* — Edward Cain
(74) *Attorney, Agent, or Firm* — K&L Gates LLP

(57) ABSTRACT

The invention relates to a method for producing compositions containing vinyl-aromatic copolymers that are obtained in an emulsion polymerization process and comprise production-related salt inclusions. Said compositions are characterized by improved surface quality following storage in a warm-humid environment and are therefore suitable for producing molded articles having a class A surface that remains flawless over time.

24 Claims, No Drawings

METHOD FOR THE PRODUCTION OF ABS COMPOSITIONS HAVING AN IMPROVED SURFACE FOLLOWING STORAGE IN A WARM-HUMID ENVIRONMENT

CROSS REFERENCE TO RELATED APPLICATIONS

This application is a §371 National Stage Application of PCT/EP2014/052258, filed 5 Feb. 2014, which claims priority to EP 13154460.3, filed 7 Feb. 2013.

BACKGROUND

Field of the Invention

The present invention relates to a process for producing compositions comprising vinylaromatic copolymers which have been produced in a emulsion polymerization process and have production-related salt inclusions, which feature improved surface quality after storage under warm and moist conditions and, in this respect, are suitable for production of shaped bodies having an aging-stable defect-free class A surface. More particularly, the invention relates to a process in which the copolymers are moistened by contact with water vapor or air which has been mixed with water vapor. Moistening is accomplished utilizing a shaft drier, air circulation drier or climate-controlled silo. The granular material pretreated under controlled ambient conditions and for given times is subsequently processed in a compounding step.

Description of Related Art

The present invention additionally relates to the compositions produced by the process according to the invention and to the use thereof for production of shaped bodies compliant with class A surface requirements and having a partial or full high-gloss finish, which may optionally be subjected partly or fully to a further surface treatment step by, for example, painting, in-mold coating of films, metalization via vacuum deposition or electroplating.

Compositions comprising vinylaromatic copolymers prepared by the emulsion polymerization process, and containing production-related salt inclusions, are known from the literature. Sources of such production-related salt inclusions are manifold, for example emulsifier solutions, polymerization initiator solutions, buffer solutions and precipitant solutions which are used as auxiliaries in the emulsion polymerization process, and which, depending on the process, remain in the material or else are removed again from the material only incompletely in the course of workup of the polymer. Especially the precipitation of vinyl polymer latices produced in emulsion polymerization which is generally conducted in conventional processes, as, for example, in EP 459 161 B1, DE 2 021 398 and DE 28 15 098, by means of addition of acids and/or salts makes a considerable contribution to the salt burden of the final polymer, since these salts can generally be removed from the product again by downstream process steps (washing) only insufficiently or with a high level of cost and inconvenience (energy and water/wastewater). Coagulants used are, for example and with preference, aqueous solutions of water-soluble salts, for example alkali metal, alkaline earth metal or aluminum chlorides, alkali metal, alkaline earth metal or aluminum sulfates, alkali metal, alkaline earth metal or aluminum nitrates, alkali metal, alkaline earth metal or aluminum phosphates, alkali metal, alkaline earth metal or aluminum acetates, alkali metal, alkaline earth metal or aluminum formates, alkali metal, alkaline earth metal or aluminum aluminates or alkali metal, alkaline earth metal or aluminum carbonates, more preferably aluminum chloride, calcium chloride and magnesium sulfate solutions, optionally in combination with inorganic or organic acids, for example hydrochloric acid, sulfuric acid, phosphoric acid, boric acid, formic acid, acetic acid, propionic acid and citric acid.

The literature states that such salt inclusions in compositions comprising vinylaromatic copolymers can lead to undesirable effects.

By way of example, WO 2009/071537 discloses that magnesium compounds and/or calcium compounds in impact-modified vinylaromatic copolymers selected from the group of the acrylonitrile-butadiene-styrene copolymers (ABS), acrylonitrile-styrene-acrylate-copolymers (ASA) and methacrylate-acrylonitrile-butadiene-styrene copolymers (MABS), optionally comprising polycarbonate and additives, lead to undesirable deposit formation on the shaping mold in the course of thermoplastic shaping via injection molding or extrusion, and in that respect claims compositions of this type having a content of magnesium compounds and/or calcium compounds of 0 mg/kg to 100 mg/kg. The emulsion polymers used in said compositions are usually precipitated by freeze precipitation in a flake ice machine, rather than by the conventional addition of magnesium sulfate solution.

WO 98/28344 discloses a process for continuous coagulation of aqueous dispersions of graft rubbers via shear, which overcomes the known disadvantage of precipitation by means of acids and/or salts as coagulants, in that contaminants often remain in the polymers after workup, and these can lead to impairment of product properties.

One problem with thermoplastic compositions comprising vinylaromatic copolymers prepared by the emulsion polymerization process with production-related salt inclusions is that when moldings produced from these are exposed to moisture (for example condensation or humidity), particularly at elevated temperatures, they are susceptible to undesirable development of surface defects (blistering), which restrict the use of compositions of this type in moldings with a high-gloss finish and those compliant with Class A surface requirements.

EP 2 398 842 A1 discloses a compounding process for production of impact-modified polycarbonate compositions having a reduced content of volatile organic compounds, in which 2% to 40% by weight, based on the sum total of impact modifier and water, of liquid water is added to the pulverulent graft polymer used as impact modifier and the preliminary mixture thus prepared is used in the compounding of the impact-modified polycarbonate compositions. This process corresponds to a comparative example in this application.

DE 102 009 007 789 describes a standard shaft drier. A unit of this kind is used to dry bulk goods.

WO0143556 describes the moistening and ozone treatment of flour in a moistening silo. There is no mention here of polymer granules.

JP11056092 discloses a rice silo having moisture regulation (including spray introduction nozzles) for applications in the food industry. There is likewise no mention here of polymer granules.

WO9857110 describes a silo for controlling moisture content. It is possible here to intensify drying of the air. Active moistening of the air is impossible.

US2007256316 discloses a shaft drier for soy beans, in which the soy beans are purely dried. Moistening is likewise not envisaged.

DE3303164 describes the production of non-sintered fine iron ore material with cement as hydraulic binder. Pellets are present in the shaft reactor. There is a pretreatment zone with relative humidity<=70%, a hydration zone with introduction of saturated steam at 50° C. to 100° C., and a drying zone. Condensation in the hydration zone is desirable and is used to heat the granules.

SUMMARY

The problem addressed by the present invention was thus that of providing an improved process which allows the production of thermoplastic compositions comprising vinylaromatic copolymers which have been produced in an emulsion polymerization process, have production-related salt inclusions, and feature improved surface quality after storage under warm and moist conditions and in this respect are suitable for production of shaped bodies having an aging-stable, visually defect-free class A surface.

"Visually defect-free class A surfaces" in the context of present invention means surfaces which do not have blisters in a number and diameter unappealing to the naked eye. Preferably, such "visually defect-free class A surfaces" have a relative area of defects having blister topography, based on the surface size examined ($A_{rel}$), of less than 50 ppm, preferably of less than 30 ppm, more preferably of less than 20 ppm.

In addition, these surfaces, in a preferred embodiment, after a treatment under warm and moist conditions (condensation water test according to DIN EN ISO 6270-2, test duration 72 h), have no blisters having a diameter greater than 300 μm.

Such visually defect-free class A surfaces, however, nevertheless frequently have blisters visible with optical aids, for example a magnifying glass or microscope. The relative area of defects having blister topography, based on the surface size examined ($A_{rel}$), is preferably 0.1 to 50 ppm, more preferably 1 to 30 ppm, more preferably 3 to 20 ppm. The maximum defect size, i.e. the diameter of the largest defects having blister topography found on such visually defect-free class A surfaces, is preferably within a range from 10 μm to 300 μm.

It has now been found that, surprisingly, this problem is solved by a process for producing compositions comprising
A) 0 to 98 parts by weight, preferably 1 to 95 parts by weight, especially 30 to 85 parts by weight, based on the sum total of A and B, of a thermoplastic polymer or a mixture of a plurality of thermoplastic polymers different from B and
B) 2 to 100 parts by weight, preferably 5 to 99 parts by weight, more preferably 15 to 70 parts by weight, based on the sum total of A and B, of
   B1) at least one graft polymer prepared in an emulsion polymerization process,
   B2) optionally at least one graft polymer prepared by the bulk, suspension or solution polymerization process,
   B3) optionally at least one rubber-free vinyl(co)polymer and
C) 0 to 30 parts by weight, preferably 0.1 to 20 parts by weight, especially 0.3 to 7 parts by weight, based on the sum total on A and B, of at least one commercially available polymer additive,
where the sum total of parts by weight A and B is 100, and component B, preferably component B1 or a pre-compound composed of component B1 with at least one of components B2 and B3 or with a portion of at least one of components B2 and B3, more preferably a pre-compound composed of component B1 and the entirety or a portion of component B3, comprises at least one inorganic salt consisting of a cation selected from the group of the alkali metals, alkaline earth metals and aluminum and an anion selected from the group consisting of chloride, sulfate, nitrate, phosphate, acetate and formate, in a concentration of the salt or salt mixture of 100 to 5000 mg/kg, preferably of 150 to 2000 mg/kg, more preferably of 200 to 1000 mg/kg, based on the composition, and
characterized in that
a) in a first process step the entirety of the component(s) containing the salt from B, optionally together with a portion or the entirety of the remaining components from B, A and C, is contacted in a shaft drier, air circulation drier or climate-controlled silo with a water vapor-containing atmosphere having, in a preferred embodiment, a relative air humidity of at least 70%, preferably at least 80%, more preferably at least 90%,
b) in a second process step the component(s) thus contacted with water are melted and kneaded in the molten state and/or
c) in a third process step the component thus prepared is mixed with the remaining components of the composition, the mixture is melted again and kneaded, and the components of the mixture are interdispersed in this way,
where a reduced pressure of preferably at least 200 mbar, further preferably of at least 500 mbar, more preferably of at least 800 mbar is applied at least in one of steps b) and c) and, in this way, the water introduced into the process in process step a) is removed again from the product.

DETAILED DESCRIPTION OF A PREFERRED EMBODIMENT

In a preferred industrial embodiment, the contacting with a water vapor-containing atmosphere is effected in chemical engineering units as basically known from the prior art from the drying of polymer granules or other substances. Examples here include air circulation driers which are charged continuously with water vapor or else with water vapor admixed, optionally heated air rather than with dry warm air, or else in silos charged continuously in countercurrent or crosscurrent relative to the granule flow with water vapor or else with water vapor admixed, optionally heated air.

According to the invention, a plant for continuous or batchwise operation for moistening of polymer granules is used.

This plant may correspond in terms of design to a conventional shaft drier or to a differently constructed silo having an air inlet. The construction of such plants is known and described in the prior art (for example from DE 102 009 007 789 (Stela-Laxhuber)). In contrast to the conventional mode of operation as a shaft drier, in the context of the present invention, the feeding of moist air or another moist carrier gas or moist gas mixture is undertaken rather than the introduction of drying gas. The flow through these constructions may be in countercurrent or in crosscurrent relative to the granule flow.

In a preferred embodiment, the polymer granules are fed in on one side of the interior, preferably at the top, and removed again at another side, preferably at the bottom.

Granules are stored under controlled ambient conditions in terms of temperature, moisture and pressure in a silo or shaft drier for a given time.

The storage takes place within a temperature range from 20 to 95° C., preferably from 30° C. to 90° C., more preferably from 40° C. to 85° C.

The moisture content of the gas space within the plant is at least 70%, preferably at least 80%, more preferably at least 90%. In the wall region of the interior, the temperature should preferably not go below the dew point, in order to avoid accumulation of water in the plant output. For this purpose, insulation and optionally heating of the vessel are advantageous.

The controlled air humidity in the silo or shaft drier, in a preferred embodiment, is achieved by introduction of water vapor or of air mixed with water vapor. The relative air humidity of this introduced water vapor or of the introduced air which has been mixed with water vapor may contain a lower or higher air humidity than the air humidity present in the silo or shaft drier (example: air humidity of the introduced air: 77% r.h., relative air humidity in the silo>90% r.h. in the steady state).

The pressure within the plant is preferably standard pressure, especially in the range from 0.8 to 1.2 bar. One possible variant in the execution is that of increasing the pressure to 500 bar.

As a result of the flow through the bed of granules, there may be a pressure drop in the range of 100-500 mbar, preferably 200-400 mbar, more preferably 250-350 mbar. This results in an embodiment with a pressure drop within the plant from the gas introduction point to the outflow orifice.

The granules may be heated to the required temperature in the silo or shaft drier by means of water vapor or air mixed with water vapor. Condensation in the silo or shaft drier should be very substantially avoided during the process. In a preferred embodiment, the silo or shaft drier is thermally insulated against ambient temperature. In a further preferred embodiment, the silo or shaft drier is heated isothermally.

In a further embodiment, especially when condensation occurs in the silo or shaft drier, the granules in the vessel outlet may additionally be contacted with dry and/or heated air in order to prevent condensation in the output. This can be effected within the plant just upstream of the exit of the granules or directly downstream.

In the alternative embodiment, connected downstream of the silo or shaft drier is an apparatus for surface drying of the granules discharged. Such an apparatus may, for example, be a belt drier, a centrifugal drier, a fluidized bed drier, a flow drier or a conveying system, for example an entrained flow conveying system with dry and/or heated air. This step assures easy transportability, storability and meterability of the granules in downstream processing steps.

In a preferred embodiment, the silo or shaft drier is operated with continuous granule input and output.

The mean residence time of the granules in the silo or shaft drier is preferably at least 24 h, preferably at least 48 h, more preferably at least 72 h. In the preferred execution, the granules are transported by means of plug flow in the silo or shaft drier, and no core flow occurs. In this case, preferably not more than 10% of the granules should experience a residence time of less than 72 h and not more than 1% of the granules should experience a residence time of less than 24 h. In the preferred embodiment, the mean residence time is not longer than 1000 h, preferably not longer than 700 h, more preferably not longer than 500 h, most preferably not longer than 200 h.

Preferably, the exposure time of the component(s) B containing the salt or only the component B1 containing the salt, or of the pre-compound containing the salt and composed of component B1 with at least one of components B2 and B3 or with a portion of at least one of components B2 and B3, with water or water vapor is at least 24 h, preferably at least 48 h, more preferably at least 72 h. In a likewise preferred embodiment, the exposure time is not longer than 1000 h, preferably not longer than 700 h, more preferably not longer than 500 h, most preferably not longer than 200 h. Preferably, the component(s) B containing the salt, or only the component B1 containing the salt, or the pre-compound containing the salt and composed of component B1 with at least one of components B2 and B3 or with a portion of at least one of components B2 and B3, is used in the form of granules.

Further preferably, the internal moisture content of the components contacted with water vapor or water vapor-containing atmosphere in process step a), at the time of use in process step b) or c), is 0.3% to 2.0% by weight, even further preferably from 0.5% to 1.8% by weight and more preferably from 0.6% to 1.6% by weight, based on component(s) B, or the respective sub-component(s) subjected to water contact.

The internal moisture content is determined after surface granule drying by means of Karl Fischer titration. The granules are heated to a temperature of 80° C. to constant weight with an IR balance in order to remove the moisture adhering to the surface. The amount of water removed in this way, based on the granule weight, is referred to as surface moisture content. Thereafter, the surface-dried granules are subjected to a Karl Fischer titration. The internal moisture content refers to the amount of water which is determined by means of Karl Fischer titration based on the granule weight. The total moisture content of a granular material corresponds to the sum total of internal moisture content and surface moisture content.

In an alternative embodiment, the silo or shaft drier can also be operated batchwise.

"Granules" in the context of the invention are understood to mean a component or a mixture composed of a plurality of components present in the solid state of matter. The size of the granules 2-5 mm, more preferably 2.5-4 mm. The granule grains may be of any desired shape, for example lenticular shape, spherical shape or cylindrical shape.

"Powder" or "pulverulent" in the context of the invention is understood to mean a component or a mixture of a plurality of components which is in the solid state of matter and in which the particles have particle sizes of less than 2 mm, preferably of less than 1 mm, especially of less than 0.5 mm.

Optionally, there may be further steps between the moistening and compounding, for example for storage, dispensing, transport or the like.

The relative air humidity of the water vapor-containing atmosphere is understood to mean the percentage ratio of water vapor concentration in the atmosphere and water vapor saturation concentration under the respective ambient conditions (temperature and pressure). It is determined with a conventional hygrometer, for example with an electrical moisture sensor.

In an alternative and preferred embodiment, the entirety of components A and C and the residual amounts of component B are added to the composition at the early stage of process step (b) and interdispersed by the kneading operation, and the water introduced into the process in process step a) is removed again from the product by applying a reduced pressure of preferably at least 200 mbar, further preferably of at least 500 mbar, more preferably of at least 800 mbar.

In a last step e), the composition is generally subsequently cooled again and granulated.

According to the invention, component B, preferably component B1, contains at least one inorganic salt consisting of a cation selected from the group of the alkali metals, alkaline earth metals and aluminum, and an anion selected from the group consisting of chloride, sulfate, nitrate, phosphate, acetate and formate.

Preferably, the salt is an alkali metal, alkaline earth metal or aluminum chloride or an alkali metal, alkaline earth metal or aluminum sulfate, or a mixture thereof; more preferably, the salt is selected from the group consisting of aluminum chloride, calcium chloride and magnesium sulfate, or mixtures thereof; most preferably, the salt is magnesium sulfate.

In a preferred embodiment, the composition consists only of the components A, B and C.

In another preferred embodiment, component B consists of at least two components selected from the group consisting of B1, B2 and B3, further preferably of components B1 and B3, more preferably of B1, B2 and B3.

The inorganic salt is preferably introduced via component B1 into the composition which preferably contains the salt as a production-related impurity. More preferably, the salt is present in component B1 in the form of production-related salt inclusions.

Component B, preferably component B1, contains the salt in a concentration of 100 to 5000 mg/kg, preferably of 150 to 3000 mg/kg, more preferably of 200 to 1500 mg/kg, based on the composition.

The content of inorganic salt is determined via the anion contents of chloride, sulfates, nitrate, phosphate, acetate or formate, preferably chloride or sulfate, more preferably sulfate. Such a determination is effected after suitable material digestion by ion chromatography via conductivity measurement according to the method described in the examples for determining the magnesium sulfate content.

What is advantageous in this process is firstly the simpler substantial, in preferred embodiments exclusive, handling of component B and constituents thereof in the form of granules compared to powders, which have a tendency to stick and are also prone to explosion, and secondly also the possibility of using ABS in granule form with a high production-related salt burden without further complex purification steps such as washing or melt filtration for production of class A surface components.

Component A

Useful components A in principle include all kinds of component B of various thermoplastic polymers or mixtures of two or more than two such thermoplastic polymers.

Examples include polyolefins (such as polyethylene and polypropylene), thermoplastic polyurethanes, polyacetals (such as polyoxymethylene and polyphenylene ether), polyamides, polyimides, polycarbonates, polyesters, polyester carbonates, polysulfones, polyarylates, polyaryl ethers, polyphenylene ethers, polyaryl sulfones, polyaryl sulfides, polyether sulfones, polyphenylene sulfide, polyether ketones, polyamide imides, polyether imides and polyester imides.

As component A, particular preference is given to using at least one polymer selected from the group consisting of polycarbonate, polyestercarbonate and polyester, particularly preferably at least one polymer selected from the group consisting of aromatic polycarbonate, aromatic polyestercarbonate and aromatic polyester, most especially preferably a polymer selected from the group consisting of aromatic polycarbonate and aromatic polyester carbonate.

Aromatic polycarbonates and/or aromatic polyestercarbonates in accordance with component A which are suitable in accordance with the invention are known from the literature or preparable by processes known from the literature (for preparation of aromatic polycarbonates see, for example, Schnell, "Chemistry and Physics of Polycarbonates", Interscience Publishers, 1964, and also DE-B 1 495 626, DE-A 2 232 877, DE-A 2 703 376, DE-A 2 714 544, DE-A 3 000 610, DE-A 3 832 396; for preparation of aromatic polyestercarbonates, for example DE-A 3 077 934).

Aromatic polycarbonates are prepared, for example, by reacting diphenols with carbonic halides, preferably phosgene, and/or with aromatic dicarbonyl dihalides, preferably benzenedicarbonyl dihalides, by the interfacial process, optionally using chain terminators, for example monophenols, and optionally using trifunctional or more than trifunctional branching agents, for example triphenols or tetraphenols. Preparation is likewise possible via a melt polymerization process through reaction of diphenols with, for example, diphenyl carbonate.

Diphenols for preparation of the aromatic polycarbonates and/or aromatic polyestercarbonates are preferably those of the formula (I)

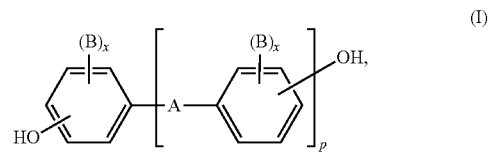

where
A is a single bond, C1 to C5-alkylene, C2 to C5-alkylidene, C5 to C6-cycloalkylidene, —O—, —SO—, —CO—, —S—, —SO2-, C6 to C12-arylene, onto which may be fused further aromatic rings optionally containing heteroatoms,
or a radical of the formula (II) or (III)

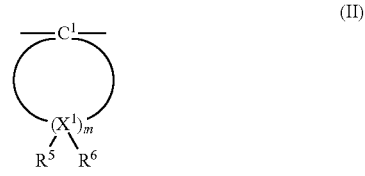

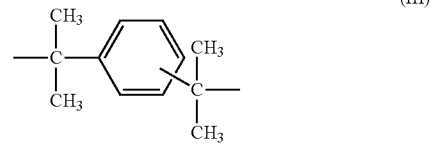

B in each case is C1 to C12-alkyl, preferably methyl, halogen, preferably chlorine and/or bromine,
x in each case is independently 0, 1 or 2,
p is 1 or 0, and
R5 and R6 can be chosen individually for each X1 and are each independently hydrogen or C1 to C6-alkyl, preferably hydrogen, methyl or ethyl,
X1 is carbon and
m is an integer from 4 to 7, preferably 4 or 5, with the proviso that R5 and R6 on at least one X1 atom are simultaneously alkyl.

Preferred diphenols are hydroquinone, resorcinol, dihydroxydiphenols, bis(hydroxyphenyl)-C1-C5-alkanes, bis(hydroxyphenyl)-C5-C6-cycloalkanes, bis(hydroxyphenyl) ethers, bis(hydroxyphenyl)sulfoxides, bis(hydroxyphenyl) ketones, bis(hydroxyphenyl) sulfones and α,α-bis(hydroxyphenyl)diisopropylbenzenes, and the ring-brominated and/or ring-chlorinated derivatives thereof.

Particularly preferred diphenols are 4,4'-dihydroxydiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenyl sulfide, 4,4'-dihydroxydiphenyl sulfone and the di- and tetrabrominated or chlorinated derivatives thereof, for example 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane, 2,2-Bis(4-hydroxyphenyl)propane (bisphenol A) is especially preferred.

It is possible to use the diphenols individually or in the form of any desired mixtures. The diphenols are known from the literature or obtainable by processes known from the literature.

Examples of chain terminators suitable for the preparation of the thermoplastic aromatic polycarbonates include phenol, p-chlorophenol, p-tert-butylphenol or 2,4,6-tribromophenol, but also long-chain alkylphenols such as 4-[2-(2,4,4-trimethylpentyl)]phenol, 4-(1,3-tetramethylbutyl)phenol according to DE-A 2 842 005 or monoalkylphenol or dialkylphenols having a total of 8 to 20 carbon atoms in the alkyl substituents, such as 3,5-di-tert-butylphenol, p-isooctylphenol, p-tert-octylphenol, p-dodecylphenol and 2-(3,5-dimethylheptyl)phenol and 4-(3,5-dimethylheptyl)phenol. The amount of chain terminators to be used is generally between 0.5 mol % and 10 mol %, based on the molar sum of the diphenols used in each case.

The thermoplastic aromatic polycarbonates preferably have mean weight-average molecular weights (Mw, measured by gel permeation chromatography in methylene chloride at 25° C. with polycarbonate as standard) of 20 000 to 40 000 g/mol, preferably 22 000 to 35 000 g/mol, more preferably 24 000 to 32 000 g/mol.

The thermoplastic aromatic polycarbonates may be branched in a known manner, preferably through the incorporation of 0.05 to 2.0 mol %, based on the sum total of the diphenols used, of trifunctional or more than trifunctional compounds, for example those having three or more phenolic groups.

Both homopolycarbonates and copolycarbonates are suitable. For preparation of inventive copolycarbonates in accordance with component A, it is also possible to use 1 to 25% by weight, preferably 2.5 to 25% by weight, based on the total amount of diphenols to be used, of polydiorganosiloxanes having hydroxyaryloxy end groups. These are known (U.S. Pat. No. 3,419,634) and are preparable by processes known from the literature. The preparation of polydiorganosiloxane-containing copolycarbonates is described in DE-A 3 334 782.

Preferred polycarbonates are, as well as the bisphenol A homopolycarbonates, the copolycarbonates of bisphenol A with up to 15 mol %, based on the molar sums of diphenols, of other diphenols specified as preferred or particularly preferred, especially 2,2-bis(3,5-dibromo-4-hydroxyphenyl) propane.

Aromatic dicarbonyl dihalides for preparation of aromatic polyestercarbonates are preferably the diacid dichlorides of isophthalic acid, terephthalic acid, diphenyl ether 4,4'-dicarboxylic acid and naphthalene-2,6-dicarboxylic acid.

Particular preference is given to mixtures of the diacid dichlorides of isophthalic acid and terephthalic acid in a ratio between 1:20 and 20:1.

In the preparation of polyestercarbonates, a carbonic halide, preferably phosgene, is also additionally used as a bifunctional acid derivative.

Useful chain terminators for the preparation of the aromatic polyestercarbonates include, apart from the monophenols already mentioned, the chlorocarbonic esters thereof and the acid chlorides of aromatic monocarboxylic acids, which may optionally be substituted by C1 to C22-alkyl groups or by halogen atoms, and aliphatic C2 to C22-monocarbonyl chlorides.

The amount of chain terminators in each case is 0.1 to 10 mol %, based on moles of diphenol in the case of the phenolic chain terminators and on moles of dicarbonyl dichloride in the case of monocarbonyl chloride chain terminators.

The aromatic polyestercarbonates may also contain incorporated aromatic hydroxycarboxylic acids.

The aromatic polyestercarbonates may be either linear or branched in a known manner (see DE-A 2 940 024 and DE-A 3 007 934).

Branching agents used may, for example, be tri- or multifunctional carbonyl chlorides, such as trimesyl trichloride, cyanuric trichloride, 3,3',4,4'-benzophenonetetracarbonyl tetrachloride, 1,4,5,8-naphthalenetetracarbonyl tetrachloride or pyromellitic tetrachloride, in amounts of 0.01 to 1.0 mol % (based on dicarbonyl dichlorides used), or tri- or multifunctional phenols, such as phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane, 2,6-bis(2-hydroxy-5-methylbenzyl)-4-methylphenol, 2-(4-hydroxyphenyl)-2-(2,4-dihydroxyphenyl)propane, tetra(4-[4-hydroxyphenylisopropyl]phenoxy)methane, 1,4-bis[4,4'-dihydroxytriphenyl)methyl]benzene, in amounts of 0.01 to 1.0 mol %, based on diphenols used. Phenolic branching agents may be initially charged together with the diphenols; acid chloride branching agents may be introduced together with the acid dichlorides.

The proportion of carbonate structural units in the thermoplastic aromatic polyestercarbonates may vary as desired. Preferably, the proportion of carbonate groups is up to 100 mol %, especially up to 80 mol %, more preferably up to 50 mol %, based on the sum total of ester groups and carbonate groups. Both the ester fraction and the carbonate fraction of the aromatic polyestercarbonates may be present in the form of blocks or in random distribution in the polycondensate.

The thermoplastic aromatic polycarbonates and polyestercarbonates may be used alone or in any desired mixture.

Component B1

Component B1 comprises graft polymers prepared in an emulsion polymerization process of, in a preferred embodiment, B1.1) 5% to 95% by weight, preferably 10% to 70% by weight, more preferably 20% to 60% by weight, based on component B1, of a mixture of B1.1.1) 65% to 85% by weight, preferably 70% to 80% by weight, based on B1.1, of at least one monomer selected from the group of the vinylaromatics (for example styrene, α-methylstyrene), ring-substituted vinylaromatics (for example p-methylstyrene, p-chlorostyrene) and (C1-C8)-alkyl methacrylates (for example methyl methacrylate, ethyl methacrylate) and B1.1.2) 15% to 35% by weight, preferably 20% to 30% by weight, based on B1.1, of at least one monomer selected from the group of the vinyl cyanides (for example unsaturated nitriles such as acrylonitrile and methacrylonitrile), (C1-C8)-alkyl(meth)acrylates (for example methyl methacrylate, n-butyl acrylate, tert-butyl acrylate) and derivatives (for example anhydrides and imides) of unsaturated carboxylic acids (for example maleic anhydride and N-phenylmaleimide)

onto

B1.2) 95% to 5% by weight, preferably 90% to 30% by weight, more preferably 80% to 40% by weight, based on component B 1, of at least one elastomeric graft base.

The graft base preferably has a glass transition temperature of <0° C., further preferably <−20° C., more preferably <−60° C.

Glass transition temperatures, unless stated otherwise in the present invention, are determined by means of dynamic differential calorimetry (DSC) to the standard DIN EN 61006 at a heating rate of 10 K/min, with definition of the Tg as the midpoint temperature (tangent method), and nitrogen as protective gas.

The graft particles in component B1 preferably have a median particle size (D50) of 0.05 to 5 µm, preferably of 0.1 to 1.0 µm, more preferably of 0.2 to 0.5 µm.

The median particle size D50 is the diameter with 50% by weight of the particles above it and 50% by weight below it. It is determined, unless explicitly stated otherwise in the present application, by means of ultracentrifuge measurement (W. Scholtan, H. Lange, Kolloid, Z. and Z. Polymere [Polymers] 250 (1972), 782-1796).

Preferred monomers B1.1.1 are selected from at least one of the monomers styrene, α-methylstyrene and methyl methacrylate; preferred monomers B1.1.2 are selected from at least one of the monomers acrylonitrile, maleic anhydride and methyl methacrylate.

Particularly preferred monomers are B1.1.1 styrene and B1.1.2 acrylonitrile.

Graft bases B1.2 suitable for the graft polymers B1 are, for example, diene rubbers, diene-vinyl block copolymer rubbers, EP(D)M rubbers, i.e. those based on ethylene/propylene and optionally diene, acrylate rubbers, polyurethane rubbers, silicone rubbers, chloroprene rubbers and ethylene/vinyl acetate rubbers, and also mixtures of such rubbers or silicone-acrylate composite rubbers in which the silicone and acrylate components are chemically joined to one another (for example by grafting) to one another.

Preferred graft bases B1.2 are diene rubbers (for example based on butadiene or isoprene), diene-vinyl block copolymer rubbers (for example based on butadiene and styrene blocks), copolymers of diene rubbers with further copolymerizable monomers (for example according to B1.1.1 and B1.1.2) and mixtures of the aforementioned rubber types. Particular preference is given to pure polybutadiene rubber and styrene-butadiene block copolymer rubber.

The gel content of the graft polymers is at least 40% by weight, preferably at least 60% by weight, more preferably at least 75% by weight (measured in acetone).

The gel content of the graft polymers is, unless stated otherwise in the present invention, determined at 25° C. as the insoluble fraction in acetone as the solvent (M. Hoffmann, H. Krömer, R. Kuhn, Polymeranalytik I and II [Polymer Analysis I and II], Georg Thieme-Verlag, Stuttgart 1977).

The graft polymers B1 are prepared by free-radical polymerization.

The graft polymer B1 generally comprises, as a result of the preparation, free copolymer, i.e. copolymer not chemically bound to the rubber base, of B1.1.1 and B1.1.2, which is notable in that it can be dissolved in suitable solvents (e.g. acetone).

Preferably, component B1 contains a free copolymer of B1.1.1 and B1.1.2 which has a weight-average molecular weight (Mw), determined by gel permeation chromatography with polystyrene as standard, of preferably 30 000 to 150 000 g/mol, more preferably 40 000 to 120 000 g/mol.

Component B2

Component B2 of the compositions according to the invention may optionally comprise graft polymers prepared by the bulk, suspension or solution polymerization process. A preferred embodiment in this case comprises graft polymers of B2.1) 5% to 95% by weight, preferably 80% to 93% by weight, more preferably 85% to 92% by weight, most preferably 87% to 93% by weight, based on component B2, of a mixture of B2.1.1) 65% to 85% by weight, preferably 70% to 80% by weight, based on the mixture B2.1, of at least one monomer selected from the group of the vinylaromatics (for example styrene, α-methylstyrene), ring-substituted vinylaromatics (for example p-methylstyrene, p-chlorostyrene) and (C1-C8)-alkyl methacrylates (for example methyl methacrylate, ethyl methacrylate) and B2.1.2) 15% to 35% by weight, preferably 20% to 30% by weight, based on the mixture B2.1, of at least one monomer selected from the group of the vinyl cyanides (for example unsaturated nitriles such as acrylonitrile and methacrylonitrile), (C1-C8)-alkyl(meth)acrylates (for example methyl methacrylate, n-butyl acrylate, tert-butyl acrylate) and derivatives (for example anhydrides and imides) of unsaturated carboxylic acids (for example maleic anhydride and N-phenylmaleimide)

onto

B2.2) 95% to 5% by weight, preferably 20% to 7% by weight, more preferably 15% to 8% by weight, most preferably 13% to 7% by weight, based on component B2, of at least one graft base.

The graft base preferably has a glass transition temperature of <0° C., preferably <−20° C., more preferably <−60° C.

The graft particles in component B2 preferably have a median particle size (D50) of 0.1 to 10 µm, preferably of 0.2 to 2 µm, particularly preferably of 0.3 to 1.0 µm, most preferably of 0.3 to 0.6 µm.

Preferred monomers B2.1.1 are selected from at least one of the monomers styrene, α-methylstyrene and methyl methacrylate; preferred monomers B2.1.2 are selected from at least one of the monomers acrylonitrile, maleic anhydride and methyl methacrylate.

Particularly preferred monomers are B2.1.1 styrene and B2.1.2 acrylonitrile.

Graft bases B2.2 suitable for the graft polymers B2 are, for example, diene rubbers, diene-vinyl block copolymer rubbers, EP(D)M rubbers, i.e. those based on ethylene/propylene and optionally diene, acrylate rubbers, polyurethane rubbers, silicone rubbers, chloroprene rubbers and ethylene/vinyl acetate rubbers, and also mixtures of such rubbers or silicone-acrylate composite rubbers in which the silicone and acrylate components are chemically joined to one another (for example by grafting) to one another.

Preferred graft bases B2.2 are diene rubbers (for example based on butadiene or isoprene), diene-vinyl block copolymer rubbers (for example based on butadiene and styrene blocks), copolymers of diene rubbers with further copolymerizable monomers (for example according to B2.1.1 and B2.1.2) and mixtures of the aforementioned rubber types. Particularly preferred graft bases B2.2 are styrene-butadiene block copolymer rubbers and mixtures of styrene-butadiene block copolymer rubbers with pure polybutadiene rubber.

The gel content of the graft polymers B2 is preferably 10 to 35% by weight, more preferably 15 to 30% by weight, most preferably 17 to 23% by weight (measured in acetone).

Particularly preferred polymers B2 are, for example, ABS polymers prepared by free-radical polymerization, which, in a preferred embodiment, contain up to 10% by weight, more preferably up to 5% by weight, more preferably 2 to 5% by weight, based in each case on the graft polymer B2, of n-butyl acrylate.

The graft polymer B2 generally comprises, as a result of the preparation, free copolymer, i.e. copolymer not chemically bound to the rubber base, of B2.1.1 and B2.1.2, which is notable in that it can be dissolved in suitable solvents (e.g. acetone).

Preferably, component B2 contains free copolymer of B2.1.1 and B2.1.2 which has a weight-average molecular weight (Mw), determined by gel permeation chromatography with polystyrene as standard, of preferably 50 000 to 200 000 g/mol, more preferably of 70 000 to 150 000 g/mol, more preferably of 80 000 to 120 000 g/mol.

Component B3

The composition may optionally comprise, as a further component B3, (co)polymers of at least one monomer from the group of the vinylaromatics, vinyl cyanides (unsaturated nitriles), (C1 to C8)-alkyl(meth)acrylates, unsaturated carboxylic acids and derivatives (such as anhydrides and imides) of unsaturated carboxylic acids.

Especially suitable as component B3 are (co)polymers of
B3.1 50 to 99% by weight, preferably 65 to 85% by weight, more preferably 70 to 80% by weight, based on the (co)polymer B3, of at least one monomer selected from the group of the vinylaromatics (for example styrene, α-methylstyrene), ring-substituted vinylaromatics (for example p-methylstyrene, p-chlorostyrene) and (C1-C8)-alkyl(meth)acrylates (for example methyl methacrylate, n-butyl acrylate, tert-butyl acrylate) and
B3.2 1 to 50% by weight, preferably 15 to 35% by weight, more preferably 20 to 30% by weight, based on the (co)polymer B3, of at least one monomer selected from the group of the vinyl cyanides (for example unsaturated nitriles such as acrylonitrile and methacrylonitrile), (C1-C8)-alkyl(meth)acrylates (for example methyl methacrylate, n-butyl acrylate, tert-butyl acrylate), unsaturated carboxylic acids and derivatives of unsaturated carboxylic acids (for example maleic anhydride and N-phenylmaleimide).

These (co)polymers B3 are resinous, thermoplastic and rubber-free. Particular preference is given to the copolymer of B3.1 styrene and B3.2 acrylonitrile.

(Co)polymers B3 of this kind are known and can be prepared by free-radical polymerization, especially by emulsion, suspension, solution or bulk polymerization.

The (co)polymers B3 have a weight-average molecular weight (Mw), determined by gel permeation chromatography with polystyrene as standard, of preferably 50 000 to 200 000 g/mol, more preferably of 70 000 to 150 000 g/mol, more preferably of 80 000 to 130 000 g/mol.

Component C

The composition may optionally comprise other commercially available polymer additives as component C.

Useful commercial polymer additives as per component C include additives such as, for example, flame retardants (for example phosphorus or halogen compounds), flame retardant synergists (for example nanoscale metal oxides), smoke-inhibiting additives (for example boric acid or borates), antidripping agents (for example compounds from the substance classes of the fluorinated polyolefins, the silicones and aramid fibers), internal and external lubricants and demolding agents (for example pentaerythrityl tetrastearate, montan wax or polyethylene wax), flowability aids (for example low molecular weight vinyl(co)polymers), antistats (for example block copolymers of ethylene oxide and propylene oxide, other polyethers or polyhydroxy ethers, polyetheramides, polyesteramides or sulfonic salts), conductivity additives (for example conductive black or carbon nanotubes), stabilizers (for example UV/light stabilizers, thermal stabilizers, antioxidants, transesterification inhibitors, hydrolysis stabilizers), antibacterial additives (for example silver or silver salts), scratch resistance-improving additives (for example silicone oils or hard fillers such as (hollow) ceramic beads or quartz powder), IR absorbents, optical brighteners, fluorescent additives, fillers and reinforcers (e.g. talc, ground glass or carbon fibers, (hollow) glass or ceramic beads, mica, kaolin, $CaCO_3$ and glass flakes), acids, and also dyes and pigments (for example carbon black, titanium dioxide or iron oxide), or else mixtures of a plurality of the additives mentioned.

In a preferred embodiment, the inventive compositions each comprise, as component C, at least one component selected from the group of the demolding agents and stabilizers. In a particularly preferred embodiment, the demolding agent used is pentaerythrityl tetrastearate. In a particularly preferred embodiment, the stabilizer used is at least one compound selected from the group of the sterically hindered phenols, the organic phosphites and the Brønsted-acidic compounds.

As component C, the inventive compositions may especially also comprise flame retardants, for example halogenated organic compounds or phosphorus-containing flame retardants. The latter are used with preference.

Phosphorus-containing flame retardants in the sense of the invention are preferably selected from the groups of the mono- and oligomeric phosphoric and phosphonic esters, phosphonate amines and phosphazenes, and it is also possible to use mixtures of a plurality of compounds selected from one or more than one of these groups as flame retardants. It is also possible to use other halogen-free phosphorus compounds that have not been mentioned here specifically, alone or in any desired combination with other halogen-free phosphorus compounds.

Preferred mono- and oligomeric phosphoric and phosphonic esters are phosphorus compounds of the general formula (IV)

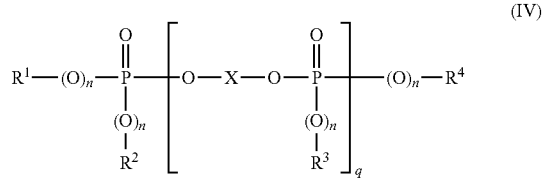

in which
R1, R2, R3 and R4 are each independently optionally halogenated C1 to C8-alkyl, in each case optionally alkyl-substituted, preferably C1 to C4-alkyl-substituted, and/or halogen-substituted, preferably chlorine- or bromine-substituted, C5 to C6-cycloalkyl, C6 to C20-aryl or C7 to C12-aralkyl,
n is independently 0 or 1,
q is 0 to 30 and
X is a mono- or polycyclic aromatic radical having 6 to 30 carbon atoms, or a linear or branched aliphatic radical having 2 to 30 carbon atoms, which may be OH-substituted and may contain up to 8 ether bonds.

Preferably, R1, R2, R3 and R4 are each independently C1 to C4-alkyl, phenyl, naphthyl or phenyl-C1-C4-alkyl. The aromatic R1, R2, R3 and R4 groups may in turn be substituted by halogen and/or alkyl groups, preferably chlorine, bromine and/or C1 to C4-alkyl. Particularly preferred aryl radicals are cresyl, phenyl, xylenyl, propylphenyl or butylphenyl, and the corresponding brominated and chlorinated derivatives thereof.

X in the formula (IV) is preferably a mono- or polycyclic aromatic radical having 6 to 30 carbon atoms. The latter preferably derives from diphenols of the formula (I).
n in the formula (IV) may independently be 0 or 1; n is preferably 1.
q represents values from 0 to 30. When mixtures of different components of the formula (IV) are used, it is possible with preference to use mixtures number-average q values of 0.3 to 10, more preferably 0.5 to 10, especially 1.05 to 1.4.
X is more preferably

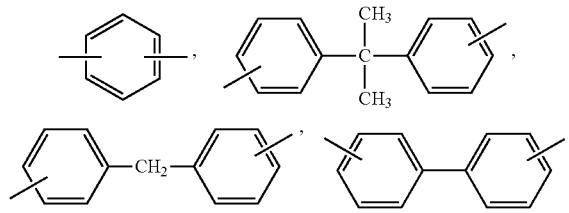

or the chlorinated or brominated derivatives thereof; more particularly, X derives from resorcinol, hydroquinone, bisphenol A or diphenylphenol. More preferably, X derives from bisphenol A.

The use of oligomeric phosphoric esters of the formula (IV) which derive from bisphenol A is particularly advantageous since the compositions modified with this phosphorus compound have a particularly high stress-cracking and hydrolysis resistance, and a particularly low tendency to form deposits in the course of processing by injection molding. In addition, it is possible with these flame retardants to achieve a particularly high heat distortion resistance.

Inventive component C used may be monophosphates (q=0), oligophosphates (q=1-30) or mixtures of mono- and oligophosphates.

Monophosphorus compounds of the formula (IV) are especially tributyl phosphate, tris(2-chloroethyl)phosphate, tris(2,3-dibromopropyl)phosphate, triphenyl phosphate, tricresyl phosphate, diphenyl cresyl phosphate, diphenyl octyl phosphate, diphenyl 2-ethylcresyl phosphate, tri(isopropylphenyl)phosphate, halogen-substituted aryl phosphates, dimethyl methylphosphonate, diphenyl methylphosphenate, diethyl phenylphosphonate, triphenylphosphine oxide or tricresylphosphine oxide.

The phosphorus compounds of the formula (IV) are known (cf., for example, EP-A 363 608, EP-A 640 655) or can be prepared in an analogous manner by known methods (e.g. Ullmanns Enzyklopädie der technischen Chemie [Ullmann's Encyclopedia of Industrial Chemistry], vol. 18, p. 301 ff. 1979; Houben-Weyl, Methoden der organischen Chemie [Methods of Organic Chemistry], vol. 12/1, p. 43; Beilstein vol. 6, p. 177).

The mean q values can be determined by using a suitable method (gas chromatography (GC), high pressure liquid chromatography (HPLC), gel permeation chromatography (GPC)) to determine the composition of the phosphate mixture (molecular weight distribution) and using this to calculate the mean values for q.

Phosphonate amines are preferably compounds of the formula (V)

$$A_{3-y}\text{-NB1}_y \qquad (V)$$

in which
A is a radical of the formula (Va)

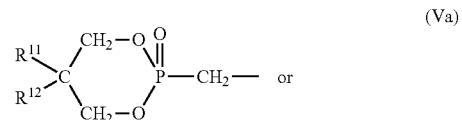

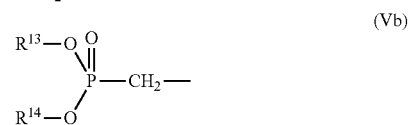

R11 and R12 are each independently unsubstituted or substituted C1-C10-alkyl or unsubstituted or substituted C6 to C10-aryl,
R13 and R14 are each independently unsubstituted or substituted C1-C10-alkyl or unsubstituted or substituted C6 to C10-aryl or
R13 and R14 together are unsubstituted or substituted C3 to C10-alkylene,
y denotes the numerical values 0, 1 or 2 and
B1 is independently hydrogen, optionally halogenated C2 to C8-alkyl, unsubstituted or substituted C6 to C10-aryl.

B1 is preferably independently hydrogen, ethyl, n- or isopropyl, which may be substituted by halogen, unsubstituted or C1 to C4-alkyl- and/or halogen-substituted C6 to C10-aryl, especially phenyl or naphthyl.

Alkyl in R11, R12, R13 and R14 is independently preferably methyl, ethyl, n-propyl, isopropyl, n-, iso-, sec- or tert-butyl, pentyl or hexyl.

Substituted alkyl in R11, R12, R13 and R14 is preferably independently halogen-substituted C1 to C10-alkyl, especially mono- or disubstituted methyl, ethyl, n-propyl, isopropyl, n-, iso-, sec- or tert-butyl, pentyl or hexyl.

C6 to C10-aryl in R11, R12, R13 and R14 is preferably independently phenyl, naphthyl or binaphthyl, especially o-phenyl, o-naphthyl, o-binaphthyl, which may be substituted by halogen (generally mono-, di- or trisubstituted).

R13 and R14 together with the oxygen atoms to which they are bonded directly and the phosphorus atom may form a ring structure.

Preferred examples include: 5,5,5',5',5",5"-hexamethyl-tris(1,3,2-dioxaphosphorinanemethane)amino-2,2',2"-trioxide of the formula (Va-1)

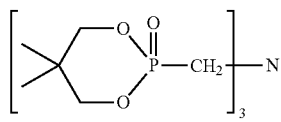

1,3,2-dioxaphosphorinane-2-methanamine, N-butyl-N[(5,5-dimethyl-1,3,2-dioxaphosphorinan-2-yl)methyl]-5,5-dimethyl-, P,2-dioxide; 1,3,2-dioxaphosphorinane-2-methanamine, N-[[5,5-dimethyl-1,3,2-dioxaphosphorinan-2-yl)methyl]-5,5-dimethyl-N-phenyl-, P,2-dioxide; 1,3,2-dioxaphosphorinane-2-methanamine, N,N-dibutyl-5,5-dimethyl-, 2-oxide, 1,3,2-dioxaphosphorinane-2-methanimine, N-[(5,5-dimethyl-1,3,2-dioxaphosphorinan-2-yl)methyl]-N-ethyl-5,5-dimethyl-, P,2-dioxide, 1,3,2-dioxaphosphorinane-2-methanamine, N-butyl-N-[(5,5-dichloromethyl-1,3,2-dioxaphosphorinan-2-yl)methyl]-5,5-dichloromethyl-, P,2-dioxide, 1,3,2-dioxaphosphorinane-2-methanamine, N-[(5,5-dichloromethyl-1,3,2-dioxaphosphorinan-2-yl)methyl]-5,5-dichloromethyl-N-phenyl-, P,2-dioxide; 1,3,2-dioxaphosphorinane-2-methanamine, N,N-di(4-chlorobutyl)-5,5-dimethyl-2-oxide; 1,3,2-dioxaphosphorinane-2-methanimine, N-[(5,5-dimethyl-1,3,2-dioxaphosphorinan-2-yl)methane]-N-(2-chloroethyl)-5,5-di(chloromethyl)-, P2-dioxide.

Preference is further given to:
compounds of the formula (Va-2) or (Va-3)

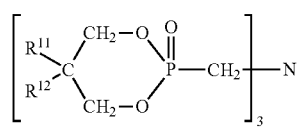

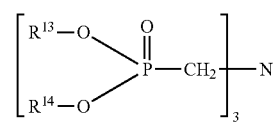

where
R11, R12, R13 and R14 are each as defined above.

Particular preference is given to compounds of the formula (Va-2) and (Va-1). The preparation of the phosphonate amines is described, for example, in U.S. Pat. No. 5,844,028.

Phosphazenes are compounds of the formulae (VIa) and (VIb)

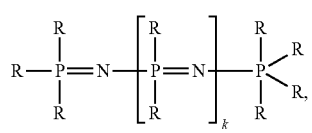

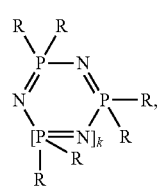

in which
R is the same or different in each case and is amino, in each case optionally halogenated, preferably fluorinated, C1 to C8-alkyl, or C1 to C8-alkoxy, in each case optionally alkyl-substituted, preferably C1 to C4-alkyl-substituted, and/or halogen-substituted, preferably chlorine- and/or bromine-substituted, C5 to C6-cycloalkyl, C6 to C20-aryl, preferably phenyl or naphthyl, C6 to C20-aryloxy, preferably phenoxy, naphthyloxy, or C7 to C12-aralkyl, preferably phenyl-C1-C4-alkyl,
k is 0 or a number from 1 to 15, preferably a number from 1 to 10.

Examples include propoxyphosphazene, phenoxyphosphazene, methylphenoxyphosphazene, aminophosphazene and fluoroalkylphosphazenes. Preference is given to phenoxyphosphazene.

The phosphazenes can be used alone or in a mixture. The R radical may always be the same, or 2 or more radicals in the formulae (VIa) and (VIb) may be different. Phosphazenes and the preparation thereof are described, for example, in EP-A 728 811, DE-A 1 961668 and WO 97/40092.

The flame retardants can be used alone or in any desired mixture with one another, or in a mixture with other flame retardants.

In addition, flame-retardant compositions, in a preferred embodiment, comprise the aforementioned flame retardants in combination with at least one antidripping agent selected from the substance classes of the fluorinated polyolefins, the silicones and aramid fibers. Particular preference is given to using polytetrafluoroethylene polymers as antidripping agents.

The molding compositions produced by the process according to the invention may be used for producing shaped bodies of any kind. These can be produced by injection molding, extrusion and blow-molding processes. A further form of processing is the production of shaped bodies by thermoforming from previously produced sheets or films.

Examples of shaped bodies of this kind are films, profiles, all kinds of housing parts, for example for domestic appliances such as juice presses, coffee machines, mixers; for office equipment such as monitors, flatscreens, notebooks, printers, copiers; sheets, tubes, electrical installation ducts, windows, doors and further profiles for the construction sector (interior fitting and exterior applications), and also electrical and electronic parts such as switches, plugs and sockets, and also bodywork and interior components for utility vehicles, especially for the automotive sector.

More particularly, the molding compositions produced by the process according to the invention can also be used, for example, for production of the following moldings or molded parts: interior fitting components for rail vehicles, ships, aircraft, buses and other motor vehicles, housing for electrical appliances containing small-scale transformers, housing for information processing and transmission devices, housing and lining for medical appliances, massage appliances and housing therefor, children's toy vehicles, flat wall elements, housing for safety devices, thermally insulated transport containers, moldings for sanitary and bathroom equipment, cover grids for blower vents and housing for garden appliances.

The molding compositions produced by the process according to the invention are also particularly suitable for preparing moldings or molded parts having class A surface requirements and high-gloss finish, which optionally have been subjected partially or fully to a further surface treatment step, for example, by lacquering, in-mold coating of foils, metallization via vacuum depositing or electroplating.

In the context of the present invention, "high-gloss" is understood to mean a gloss level determined by reflection in accordance with DIN 67530 at a measuring angle of 60° of at least 95, preferably of at least 97, particularly preferably of at least 99. The invention therefore also relates to shaped bodies or moldings formed from the compositions according to the invention having a full or partial high-gloss finish, which optionally have been subjected partly or fully to a further surface treatment step, for example, by painting, in-mold coating of films, metallization via vacuum depositing or electroplating.

The invention therefore also relates to shaped bodies or moldings formed from the compositions produced by the process according to the invention having a full or partial high-gloss finish, which optionally have been subjected partially or fully to a further surface treatment step, for example, by painting, in-mold coating of films, metallization via vacuum depositing or electroplating.

EXAMPLES

Component A1

Linear polycarbonate based on bisphenol A having a weight-average molecular weight $M_w$ of 28 kg/mol (determined by GPC in methylene chloride at 25° C. with polycarbonate as standard).

Component B1

Pre-compound, in the form of granules, composed of 50% by weight of a graft polymer of the ABS type, prepared by the emulsion polymerization process, having an A:B:S ratio of 12:50:38% by weight and 50% by weight of a styrene-acrylonitrile copolymer, prepared by the bulk polymerization process, having a styrene-acrylonitrile ratio of 76:24% by weight and having a weight-average molecular weight $M_w$ of 100 kg/mol, measured by GPC in dimethylformamide at 20° C. with polystyrene as standard. Component B1 contains, as a result of production, 900 mg/kg of the magnesium sulfate precipitant used in the coagulation of the graft polymer. This magnesium sulfate, according to detection by scanning electron microscopy (SEM) coupled to energy-dispersive x-ray spectroscopy (EDX), is in crystalline domains having a dimension of in some cases up to more than 100 µm.

The magnesium sulfate content in component B1 was determined via a quantitative determination of the sulfate ion content and by conversion thereof to magnesium sulfate, since determination from the magnesium content is not possible because of lack of selectivity for $MgSO_4$. For this purpose, about 1 g of component B1 was weighed in accurately, admixed with 25 mL of acetone, p.A., and the mixture was treated in an ultrasound bath for 30 minutes. The suspension formed was made up to 200 mL with Millipore water and shaken thoroughly. The suspension thus treated was membrane-filtered. The sulfate ion content was determined in the filtrate by ion chromatography using a DIONEX DX 600 ion chromatograph (from DIONEX) (separating column: IonPac AS 11, 4×250 mm (from DIONEX); mobile phase: NaOH gradient, c=0.004/0.076 mol/L; flow rate: 1.8 ml/min; autosampler temperature: 23° C.; column temperature: 35° C.; suppression: electrochemical, ASRS 300, 4 mm; detection: conductivity).

Component B2 n-Butyl acrylate-modified graft polymer of the ABS type, prepared by the bulk polymerization process, having an A:B:S ratio of 21:10:65% by weight and an n-butyl acrylate content of 4% by weight. The D50 of the graft particle diameters determined by ultracentrifugation is 0.5 µm. The parent graft base of the graft polymer is a styrene-butadiene block copolymer rubber (SBR). The gel content of the graft polymer measured in acetone is 20% by weight. The weight-average molecular weight $M_w$, measured by GPC with polystyrene as standard in dimethylformamide at 20° C., of the free n-butyl acrylate-modified SAN, i.e. not chemically bound to the rubber or included in the rubber particles in acetone-insoluble form, is 110 kg/mol.

Component B3

Styrene-acrylonitrile copolymer, prepared by the bulk polymerization process, having a styrene-acrylonitrile ratio of 76:24% by weight and having a weight-average molecular weight $M_w$ of 100 kg/mol, measured by GPC in dimethylformamide at 20° C. with polystyrene as standard.

Component C1

Pentaerythrityl tetrastearate as lubricant/mold release agent

Component C2

Aqueous phosphoric acid solution having a concentration of 3% by weight

Component C3

Thermal stabilizer, Irganox 1076, BASF (Ludwigshafen, Germany), and thermal stabilizer, Irganox B900, BASF (Ludwigshafen, Germany)

The compositions of the examples and comparative examples C1, 2, 3 and 4 listed in table 1 contain
60.15 parts by weight of component A1
23.08 parts by weight of component B1
8.87 parts by weight of component B2
6.51 parts by weight of component B3
0.74 part by weight of component C1
0.33 part by weight of component C2
0.32 part by weight of component C3
and differ exclusively in the process used for production.

The compositions of example 5 listed in table 1 contains
70.03 parts by weight of component A1
24.66 parts by weight of component B1
3.95 parts by weight of component B2
0 part by weight of component B3
0.74 part by weight of component C1
0.33 part by weight of component C2
0.30 part by weight of component C3
and differ exclusively in the process used for production.

Moist/Warm Treatment

The treatment of component B1 under moist and warm conditions in experiments 2, 3, 4 and 5 was conducted in an apparatus according to the invention. The apparatus according to the invention used was a silo having a capacity of 1 $m^3$. Polymer granules (component B1) were introduced continuously at 9.5 kg/h into the silo from the top. Through the opening at the bottom in the silo cone, the conditioned polymer granules were discharged continuously from the silo at 9.5 kg/h. Conditioned air was introduced into the cone of the silo. The conditioned air was produced by bubbling air through an electrically heated water bath. The conditioned air was mixed with cold unconditioned air to obtain the desired moisture content and temperature. The total air rate was 33 $m^3$/h and consisted of 23 $m^3$/h of conditioned air and 10 $m^3$/h of unconditioned air. The input moisture content of the air was 77%. The input temperature of the air was 51° C. The output temperature of the air was 44.6° C. The output moisture content was >95%. The conditioned air was discharged again from the silo via a pipe at the top. As a result of the process parameters, condensation of water in the silo occurred only to a minor degree. To avoid condensation, the silo was also encased.

Production of the Compositions and Testing

The compositions C1, 2, 3, 4 and 5 were produced on an Evolum® 32 HT twin-shaft extruder from Clextral (France) having a ratio of length to diameter L/D=36 at a melt temperature of 280 to 290° C. and with vacuum devolatilization at a pressure of 100-200 mbar (absolute).

Component B1 was used firstly in untreated form (C1), and secondly with prior exposure to an air atmosphere having a high relative air humidity in a silo or a shaft drier for the period between 33 and 101 h (2, 3, 4, 5). Details can be found in table 1. In the case in which component B1 had been subjected to the pretreatment under warm and moist conditions in the apparatus according to the invention, the product thus treated was superficially dry and was also used as such in the final compounding step.

The water absorption of component B1 in this process was determined gravimetrically/by means of Karl Fischer titration and, in inventive examples 2 and 5, is 1.4% to 1.5% by weight, based on component B1.

The granules resulting from the respective compounding operations were processed in an injection molding machine (from Arburg) at melt temperatures of 260° C. and a mold temperature of 80° C. to give sheets of dimension 150 mm×105 mm×2 mm. In this case, a high-gloss polishing tool was used. These sheets were exposed to an air atmosphere having a relative air humidity of 95% at 40° C. for 3 days. Thereafter, a visual assessment was made by 3 independent assessors according to the following assessment basis:
  ++ no blisters at all or only isolated, very small blisters
  + a few very small blisters, not to a disruptive level
  − many very small blisters and/or only isolated larger blisters
  −− many comparatively large blisters The examples and comparative examples are compiled in table 1. The data show that only those molding compositions produced by the process according to the invention have the improved surface properties after storage under warm and moist conditions according to the problem addressed by this invention, and in this respect are suitable for production of shaped bodies having an aging-stable visually defect-free class A surface.

TABLE 1

| | Examples | | | | |
|---|---|---|---|---|---|
| | C1 | −2 | −3 | 4 | 5 |
| Process | | | | | |
| Inventive | | x | x | x | x |
| Pretreatment in a moistening silo | − | x | x | x | x |
| Treatment temperature [° C.] | − | 44.6 | 42.5 | 42.5 | 44.6 |
| Relative air humidity on treatment [%] | − | 95 | 95 | 95 | 95 |
| Duration of treatment [h] | − | 72-101 | 33 | 58 | 72-101 |
| Properties | | | | | |
| Visual assessment | −− | +/++ | ++ | +/− | + |
| Moist component B1 [%] | 0.2 | 1.4-1.5 | not determined | not determined | 1.4-1.5 |

The invention claimed is:

1. A process for producing a composition comprising
A) 0 to 98 parts by weight, based on the sum total of A and B, of a thermoplastic polymer or a mixture of a plurality of thermoplastic polymers different from B and
B) 2 to 100 parts by weight, based on the sum total of A and B, of
  B1) at least one graft polymer prepared in an emulsion polymerization process,
  B2) optionally at least one graft polymer prepared by the bulk, suspension or solution polymerization process,
  B3) optionally at least one rubber-free vinyl(co)polymer and
C) 0 to 30 parts by weight, based on the sum total on A and B, of at least one commercially available polymer additive,
where the sum total of parts by weight A and B is 100, and component B, optionally component B1 or a pre-compound composed of component B1 with at least one of components B2 and B3 or with a portion of at least one of components B2 and B3, more preferably a pre-compound composed of component B1 and the entirety or a portion of component B3, comprises at least one inorganic salt consisting of a cation selected from the group of the alkali metals, alkaline earth metals and aluminum and an anion selected from the group consisting of chloride, sulfate, nitrate, phosphate, acetate and formate, in a concentration of the salt or salt mixture of 100 to 5000 mg/kg, based on the composition, and
wherein
a) in a first process step the entirety of the component(s) containing the salt from B, optionally together with a portion or the entirety of the remaining components from B, A and C, is contacted in a shaft drier, air circulation drier or climate-controlled silo with a water vapor-containing atmosphere having a relative air humidity of at least 70%,
b) in a second process step the component(s) thus contacted with water are melted and kneaded in the molten state and/or
c) in a third process step the component thus prepared is mixed with the remaining components of the composition, the mixture is melted again and kneaded, and the components of the mixture are interdispersed in this way,
where a reduced pressure of at least 200 mbar is applied at least in one of steps b) and c) and, in this way, the water introduced into the process in process step a) is removed again from the product.

2. The process as claimed in claim 1, wherein component B1 contains
B1.1) 5% to 95% by weight, based on component B1, of a mixture of
  B1.1.1) 65% to 85% by weight, based on B1.1, of at least one monomer selected from the group consisting of styrene, α-methylstyrene and methyl methacrylate, and
  B1.1.2) 15% to 35% by weight, based on B1.1, of at least one monomer selected from the group consisting of acrylonitrile, maleic anhydride and methyl methacrylate,
and
B1.2) 95% to 5% by weight, based on component B1, of at least one elastomeric graft base, optionally selected from the group consisting of polybutadiene rubber and styrene-butadiene block copolymer rubber.

3. The process as claimed in claim 1, wherein component B1 contains the inorganic salt as a production-related impurity.

4. The process as claimed in claim 1, wherein vessels, silos and/or containers are charged continuously with water vapor or else with water vapor admixed optionally heated air in countercurrent or crosscurrent relative to granule flow.

5. The process as claimed in claim 1, wherein the process is conducted continuously.

6. The process as claimed in claim 1, wherein the process is conducted batchwise.

7. The process as claimed in claim 1, wherein polymer granules are fed in on one side of the interior and removed again at another side.

8. The process as claimed in claim 1, wherein storage in a shaft drier, air circulation drier or climate-controlled silo takes place within a temperature range from 20 to 95° C.

9. The process as claimed in claim 1, wherein, a shaft drier, air circulation drier and/or climate-controlled silo is heated isothermally or has sufficient thermal insulation for an isothermal mode of operation.

10. The process as claimed in claim 1, wherein granules are additionally contacted at an outlet of a shaft drier, air circulation drier and/or climate-controlled silo with dry and/or heated air.

11. The process as claimed in claim 1, wherein the contacting with water vapor-containing atmosphere in a) is followed downstream by a further process step for removing surface water from granules discharged.

12. The process as claimed in claim 1, wherein the mean residence time of granules in a silo or shaft drier is at least 24 h.

13. The process as claimed in claim 1, wherein not more than 10% of granules experience a residence time of less than 72 h and not more than 1% of granules experience a residence time of less than 24 h.

14. The process as claimed in claim 1, wherein the component(s) B containing the salt are in the form of granules.

15. The process as claimed in claim 1, wherein the compositions comprise
A) 30 to 85 parts by weight, based on the sum total of A and B,
B) 15 to 70 parts by weight, based on the sum total of A and B,
C) 0.3 to 7 parts by weight, based on the sum total of A and B.

16. The process as claimed in claim 1, wherein the salt is an alkali metal chloride, alkaline earth metal chloride or aluminum chloride or an alkali metal sulfate, alkaline earth metal sulfate or aluminum sulfate, preferably magnesium sulfate, or a mixture thereof.

17. The process as claimed in claim 1, wherein the composition comprises, as component C, at least one representative selected from the group consisting of flame retardants, flame retardant synergists, smoke-inhibiting additives, antidripping agents, internal and external lubricants and demolding agents, flowability aids, antistats, conductivity additives, UV stabilizers, light stabilizers, thermal stabilizers, antioxidants, transesterification inhibitors, hydrolysis stabilizers, antibacterial additives, scratch resistance-improving additives, IR absorbents, optical brighteners, fluorescent additives, fillers and reinforcers, acids, and dyes and pigments.

18. The process as claimed in claim 1, wherein the composition comprises:
A) 1 to 95 parts by weight, based on the sum total of A and B, of the thermoplastic polymer or the mixture of the plurality of thermoplastic polymers different from B and
B) 5 to 99 parts by weight, based on the sum total of A and B, of
B1) the at least one graft polymer prepared in an emulsion polymerization process,
B2) optionally the at least one graft polymer prepared by the bulk, suspension or solution polymerization process,
B3) optionally the at least one rubber-free vinyl(co) polymer and
C) 0.1 to 20 parts by weight, based on the sum total on A and B, of the at least one commercially available polymer additive.

19. The process as claimed in claim 1, wherein the composition comprises:
A) 30 to 85 parts by weight, based on the sum total of A and B, of the thermoplastic polymer or the mixture of the plurality of thermoplastic polymers different from B and
B) 15 to 70 parts by weight, based on the sum total of A and B, of
B1) the at least one graft polymer prepared in an emulsion polymerization process,
B2) optionally the at least one graft polymer prepared by the bulk, suspension or solution polymerization process,
B3) optionally the at least one rubber-free vinyl(co) polymer and
C) 0.3 to 7 parts by weight, based on the sum total on A and B, of the at least one commercially available polymer additive.

20. The process as claimed in claim 1, wherein the salt or salt mixture is present in a concentration of 200 to 1000 mg/kg, based on the composition.

21. The process as claimed in claim 1, wherein, in the first process step a), the entirety of the component(s) containing the salt from B, optionally together with a portion or the entirety of the remaining components from B, A and C, is contacted in a shaft drier, air circulation drier or climate-controlled silo with a water vapor-containing atmosphere having a relative air humidity of at least 90%.

22. The process as claimed in claim 1, wherein a reduced pressure of at least 800 mbar is applied at least in one of steps b) and c) and, in this way, the water introduced into the process in process step a) is removed again from the product.

23. The process as claimed in claim 1, wherein storage in a shaft drier, air circulation drier or climate-controlled silo takes place within a temperature range from 40° C. to 85° C.

24. The process as claimed in claim 1, wherein the mean residence time of granules in a silo or shaft drier is at least 72 h.

* * * * *